United States Patent [19]
Izawa et al.

[11] Patent Number: 5,875,277
[45] Date of Patent: Feb. 23, 1999

[54] OPTICAL ATTENUATOR AND A METHOD OF MAKING THE SAME, AN OPTICAL FIBER CABLE INCORPORATING THE OPTICAL ATTENUATOR AND A METHOD OF MAKING THE SAME

[75] Inventors: Ryu Izawa; Masanori Nonomura, both of Ueda; Takao Takizawa, Toubu-machi; Satoshi Takehana, Kamiyamada-machi; Shinichi Himura, Maruko-machi, all of Japan

[73] Assignee: Totoku Electric Co., Ltd., Tokyo, Japan

[21] Appl. No.: 831,274

[22] Filed: Mar. 31, 1997

[30] Foreign Application Priority Data

Sep. 18, 1996 [JP] Japan ................................ 8-246566
Oct. 15, 1996 [JP] Japan ................................ 8-272319

[51] Int. Cl.$^6$ ............................................. G02B 6/00
[52] U.S. Cl. ............................................. 385/140; 385/96
[58] Field of Search .................... 385/140, 134, 385/137, 96, 97, 98, 99

[56] References Cited

U.S. PATENT DOCUMENTS

| | | | |
|---|---|---|---|
| 4,728,170 | 3/1988 | Robertson | 385/140 |
| 5,285,516 | 2/1994 | Wong | 385/140 |
| 5,588,087 | 12/1996 | Emmons et al. | 385/140 |
| 5,633,974 | 5/1997 | Chia | 385/140 |

FOREIGN PATENT DOCUMENTS

746881 10/1995 Japan .

*Primary Examiner*—Phan T. H. Palmer
*Attorney, Agent, or Firm*—Jordan and Hamburg

[57] ABSTRACT

One or more parts of an optical fiber is(are) exposed to a high temperature of gas flame for about 30 minutes so as to form one or more radially expanded core part(s) where a diameter of a core of the optical fiber is increased greater than its original size at a center and moderately decreased back to its original size as departing from the center. A part of the transmitting light leaks to the clad at the radially expanded core part. Leaked light hardly travels through the clad from the radially expanded core part to the output end of the optical fiber. This provides a function of an optical attenuator. Also, the attenuation is precisely adjusted to a desired level by controlling a size of the radially expanded core part. Furthermore, as an incident angle of the transmitting light from the core to the clad at the radially expanded core part becomes greater than conventional one, reflecting back the transmitting light to input side is prevented and the reflectance is minimized.

15 Claims, 7 Drawing Sheets

Prior Art

Fig. 16

Prior Art

OPTICAL ATTENUATOR AND A METHOD OF MAKING THE SAME, AN OPTICAL FIBER CABLE INCORPORATING THE OPTICAL ATTENUATOR AND A METHOD OF MAKING THE SAME

BACKGROUND OF THE INVENTION

The present invention relates to an optical attenuator for attenuating a light signal of optical communications, optical measurement, CATV, and other systems and a method of making the same, an optical fiber cable incorporating the optical attenuator and a method of making the same.

Figure 15:
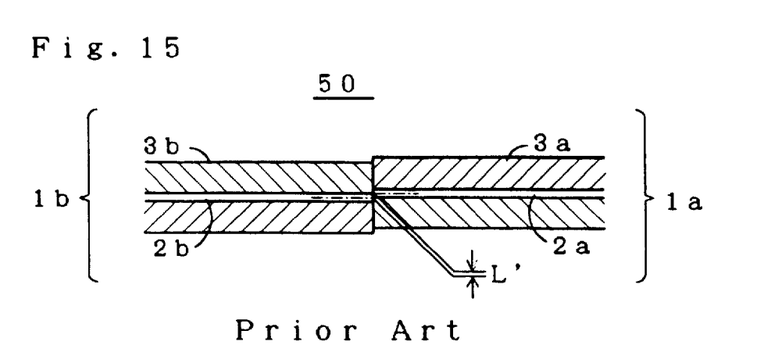
FIG. 15 is a cross-sectional view showing a conventional optical attenuator.

FIG. 15 is a cross-sectional view showing a conventional optical attenuator.

The conventional optical attenuator 50 comprises an optical fiber 1a having a core 2a covered with a clad 3a, and an optical fiber 1b having a core 2b covered with a clad 3b butted and joined at their ends to each other so that the center of one core is dislocated from the center of the other by a distance L' which is determined depending on the diameter of the cores 2a, 2b and a desired level of attenuation.

The joining is carried out by an arc discharge method. The arc discharge may be performed for e.g. three seconds.

Figure 16:
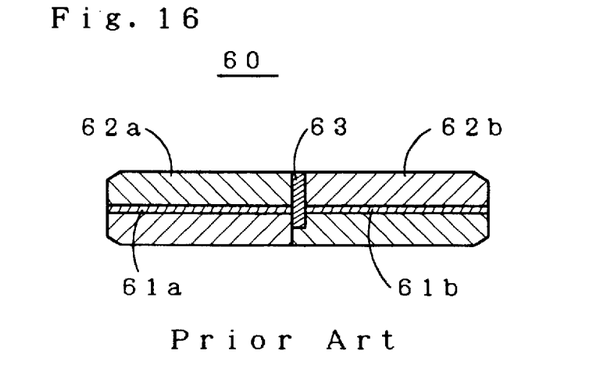
FIG. 16 is a cross-sectional view showing another conventional optical attenuator.

FIG. 16 is a cross-sectional view showing a conventional optical attenuator disclosed in Japanese Utility Model Publication No.7-46881 (1995).

The optical attenuator 60 is made by butting and joining one end of a capillary 62a covering an optical fiber 61a and one end of a capillary 62b covering an optical fiber 61b which is stepped on an end surface thereof to each other, and then inserting an attenuation film 63 into a gap formed between the two capillaries 62a and 62b.

In the conventional optical attenuator 50, an area where the core 2a (or 2b) is directly communicating with the clad 3b (or 3a) at the joint portion between the two optical fibers 1a and 1b is formed. A transmitting light is reflected back by the area to the input side. If the reflectance is high, the transmitting light reflected back to an optical oscillator, such as a laser device, will make oscillation unstable and produce noise.

The level of attenuation is determined by the distance L' between the optical axes of the two cores 2a and 2b. However, the diameter of the cores 2a and 2b is too small to control variation in the distance L', causing the level of attenuation to be set with less accuracy.

Also, as the optical centers of the two optical fibers are dislocated from each other, their joint portion is stepped and will be fitted into a connector with difficulty.

In the conventional optical attenuator 60, there is a problem that a production process becomes complex, since the end of the capillary 61b is to be stepped by a milling process. Also, there is a problem that an accuracy of attenuation is low because of error in the milling process.

SUMMARY OF THE INVENTION

It is an object of the present invention to provide an optical attenuator capable of minimizing reflection of transmitted light, having an attenuation settable to a desired level with high accuracy, while requiring no step in the cladding and a method of producing the same. Other objects of the present invention are to provide an optical fiber cable incorporating the optical attenuator and a method of producing the same.

A first feature of the present invention provides an optical attenuator, comprising S one or more radially expanded core part(s) where a diameter of a core of an optical fiber is increased greater than its original size at a center and moderately decreased back to its original size away from the center.

In the optical attenuator according to the first feature of the present invention, a part of the transmitting light leaks to the clad at the radially expanded core part. Leaked light travels little through the clad from the radially expanded core part to the output end of the optical fiber. This permits the transmitting light to be attenuated by an amount of light entering the clad, producing the function of the optical attenuator. Also, the attenuation is precisely adjusted to a desired level by controlling a size of the radially expanded core part. Furthermore, as an incident angle of the transmitting light from the core to the clad at the radially expanded core part becomes greater than a conventional one, reflection of the transmitting light to an input side is prevented and the reflectance is minimized. Moreover, there is no step in the clad as compared with the prior art, whereby the optical fiber easily fits into a connector.

A second feature of the present invention provides a method of making an optical attenuator, comprising a step of applying a high temperature to one or more parts of an optical fiber for a relatively long duration so as to form one or more radially expanded core part(s) where a diameter of a core of the optical fiber is increased greater than its original size at a center of the optical attenuator and moderately decreased back to its original size as departing from the center.

In action, one or more parts of the core to be radially expanded may be exposed to a high temperature ranging from 700° C. to 1800° C. for several minutes to tens of minutes.

In the method of making an optical attenuator according to the second feature of the present invention, the radially expanded core part is adjusted to a desired diameter by controlling the application of a high temperature (in degree and time), whereby the attenuation will accurately be set to a desired level.

A third feature of the present invention provides an optical attenuator fabricated by butting and joining two optical fibers to each other at their ends with the centers of their cores being dislocated from each other, comprising a radially expanded core part where diameters of the cores are increased greater than their original size at a joint portion and moderately decreased back to their original size as departing from the joint portion.

In the optical fixed attenuator according to the third feature of the present invention, the diameter of the cores are radially increased at the joint portion where the two optical fibers to be joined to each other with the centers of their cores being dislocated from each other and moderately decreased back to their original size as departing from the joint portion in opposite directions. This decreases an area where the core of one optical fiber is directly communicating with the clad of the other optical fiber at the joint portion. And since an area where the core of one optical fiber is directly communicating with the core of the other optical fiber is increased, it will minimize loss of transmission at the joint portion and decrease the level of attenuation to the desired level.

A fourth feature of the present invention provides a method of making an optical attenuator, comprising a step of butting two optical fibers at their ends to each other with the centers of their cores being dislocated from each other by a distance which is greater than a distance appropriate for setting to a desired level of attenuation, a step of joining the two optical fibers by arc discharge of a relatively short duration, and a step of applying a high temperature to a joint portion for a relatively long duration so as to decrease the attenuation to the desired level by forming a radially expanded core part where diameters of the cores are increased greater than their original size at a joint portion and moderately decreased back to their original size as departing from the joint portion.

The application of a high temperature for the relatively long duration may be implemented by exposing the joint portion between the two optical fibers to a flame of acetylene gas.

In action of the method of making an optical fixed attenuator according to the forth feature of the present invention, the two optical fibers are joined at their corresponding ends to each other by the arc discharge so that the center of one core is dislocated from the center of the other by a distance which is greater than that appropriate for gaining a desired level of attenuation, and applying a high temperature to the joint portion for a relatively long duration. As the result, the joint portion and adjacent portions are heated up thus causing the cores to be expanded radially and increased in diameter. This decreases an area where the core of one optical fiber is directly communicating with the clad of the other optical fiber at the joint portion. And since an area where the core of one optical fiber is directly communicating with the core of the other optical fiber is increased, it will minimize loss of transmission at the joint portion and decrease the level of attenuation to the desired level.

If the distance between the two core centers is varied more or less, the desired level of attenuation will accurately be implemented by controlling the application of a high temperature (in degree and duration of time).

In addition, the machining process for stepping the end surface of the optical fiber is not needed and the procedure of production is simplified.

A fifth feature of the present invention provides a method of making an optical attenuator according to the fourth feature of the present invention, in which the joint portion is heated up by a flame of more than 1700° C. for over one minute In action of the method of making an optical fixed attenuator according to the'fifth feature of the present invention, the joint portion is heated up by the flame of more than 1700° C. for over one minute causing the cores to be radially expanded and increased in diameter greater than their original size at the joint portion and thus moderately decreased in diameter back to their original size away from the joint portion in opposite directions. This decreases an area where the core of one optical fiber is directly communicating with the clad of the other optical fiber at the joint portion. And since an area where the core of one optical fiber is directly communicating with the core of the other optical fiber is increased, it will minimize loss of transmission at the joint portion and decrease the level of attenuation to the desired level.

A sixth feature of the present invention provides an optical attenuator according to the first or third feature of the present invention, characterized in that the radially expanded core part(s) is(are) provided in an intermediate region of the optical fiber other than two end regions not exceeding 3 cm from both, first and second, ends of the same.

The optical attenuator, according to the sixth feature of the present invention, allows the radially expanded core part to be distanced from the first and second ends of the optical fiber, preventing a light entering the clad from arriving at the first or second end. More specifically, transmitting light from the first end to the second end or vice versa is attenuated by an amount of light which has entered the clad while the optical fiber acts as a non-directional optical attenuator.

A seventh feature of the present invention provides an optical attenuator according to the first or third feature of the present invention,characterized in that the radially expanded core parts are provided at two substantially symmetrical locations spaced by less than 3 cm from the first and second ends of the optical fiber respectively.

In the optical attenuator according to the seventh feature of the present invention, a part of the transmitting light introduced from the first end of the optical fiber enters the clad at the radially expanded core part near the first end. While the leaked light is traveling a distance to the second end, it is faded out and hardly arrives at the second end. Similarly, a part of the transmitting light introduced from the second end of the optical fiber enters the clad at the radially expanded core part near the second end. While the leaked light is traveling a distance to the first end, it is faded out and hardly arrives at the first end. The transmitting light introduced from the first end to the second end or vice versa is attenuated by an amount of leaked light which has entered the clad while the optical fiber acts as a non-directional attenuator.

A eighth feature of the present invention provides an optical attenuator according to the first or third feature of the present invention, characterized in that the radially expanded core part is provided at either of locations spaced by less than 3 cm from the first and second ends of the optical fiber.

In the optical attenuator according to the eighth feature of the present invention, a part of transmitting light introduced from the first end of the optical fiber enters the clad at the radially expanded core part near the first end. While the leaked light is traveling a distance to the second end, it is faded out and hardly arrives at the second end. On the other hand, a part of transmitting light introduced from the second end of the optical fiber also enters the clad at the radially expanded core part near the first end. As the distance from the radially expanded core part to the first end is short, the leaked light is hardly faded and arrives at the first end. This allows the transmitting light to be successfully attenuated when traveling from the first end to the second end but not when traveling from the second end to the first end, ensuring that the optical fiber acts as a directional attenuator.

A ninth feature of the present invention provides an optical fiber cable incorporating an optical attenuator, which has two connectors attached respectively to both ends of an optical cord composed of an optical fiber and a coat, characterized in that the optical attenuators according to the first or third feature of the present invention are provided in each of the connectors respectively.

The optical fiber cable incorporating an optical attenuator according to the ninth feature of the present invention offers a function identical to that of the optical attenuator according to the seventh feature of the present invention. As the radially expanded core part is fitted into and protected with the connector, the optical fiber cable can be handled as a common optical cable.

An tenth feature of the present invention provides an optical fiber cable incorporating an optical attenuator, which has two connectors attached respectively to both ends of an optical cord composed of an optical fiber and a coat, characterized in that the optical attenuator according to the first or third feature of the present invention is provided in either of the connectors.

The optical fiber cable according to the tenth feature of the present invention offers a function identical to that of the optical attenuator according to the eighth feature of the present invention. As the radially expanded core part is fitted into and protected with the connector, the directional optical fiber cable can be handled as a common optical cable.

An eleventh feature of the present invention provides A method of making an optical fiber cable incorporating an optical attenuator, comprising a step of attaching two connectors to both ends of an optical cord respectively which is composed of an optical fiber and a coat to produce an optical fiber cable, a step of cutting the optical cord into two segments, a step of putting a thermally shrinkable tube on one of the segments over a cut end of the one of the segments, a step of butting the two segments to each other, a step of joining the two segments by arc discharge for a relatively short duration, a step of applying a high temperature to a joint portion for a relatively long duration to produce a radially expanded core part where diameters of the cores are increased greater than their original size at the joint portion and moderately decreased back to their original size as departing from the joint portion, and a step of shrinking the thermally shrinkable tube so that it protects the radially expanded core part.

In the method of making an optical fiber cable incorporating an optical attenuator according to the eleventh feature of the present invention, the optical fiber cable incorporating an optical attenuator which is substantially identical to that according to the sixth feature of the present invention is fabricated from a common optical fiber cable. Also, the radially expanded core part is physically protected with the normally shrinkable tube and its location is easily viewed thus being prevented from inadvertent handling.

BRIEF DESCRIPTION OF THE DRAWINGS

FIGS. 2a–2e are explanatory views showing steps of the procedure for fabricating the optical fiber cable incorporating an optical attenuator shown in FIG. 1;

DETAILED DESCRIPTION OF THE INVENTION

Embodiments of the present invention will be described in more detail referring to the accompanying drawings. It should be understood that the present invention is not limited to the embodiments.

Figure 1:
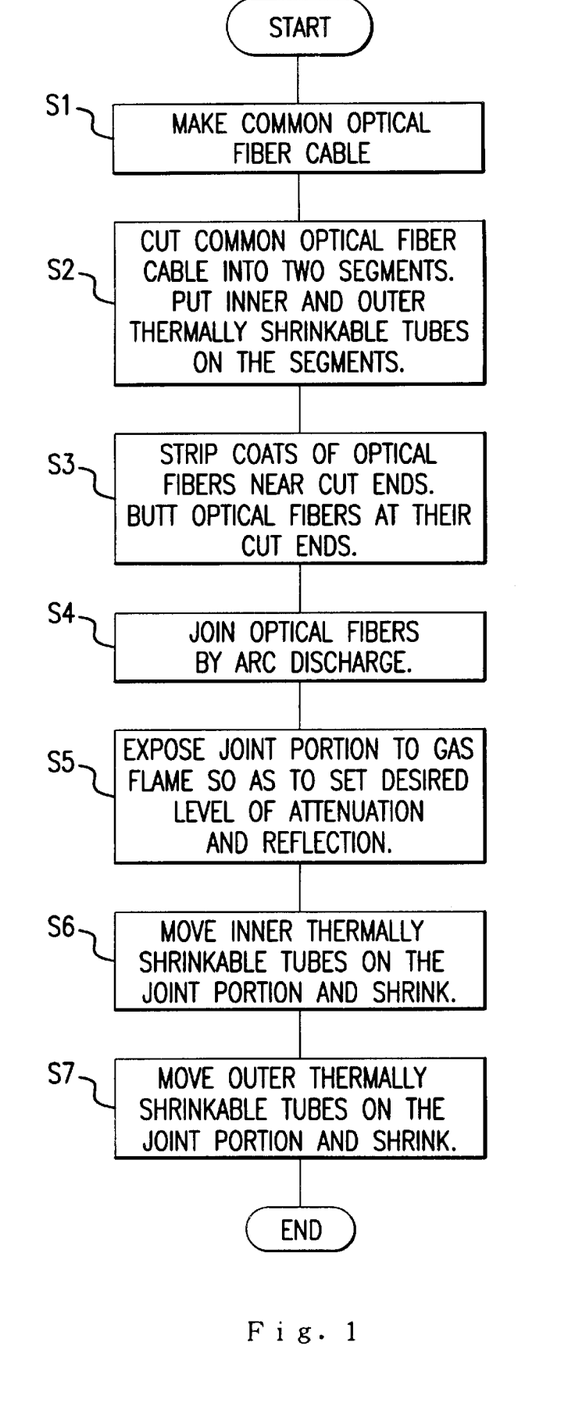
FIG. 1 is a flowchart showing a procedure of fabricating an optical fiber cable incorporating an optical attenuator according to one embodiment of the present invention.

FIG. 1 is a flowchart showing a procedure of fabricating an optical fiber cable incorporating an optical attenuator according to one embodiment of the present invention.

Figures 2A, 2E:
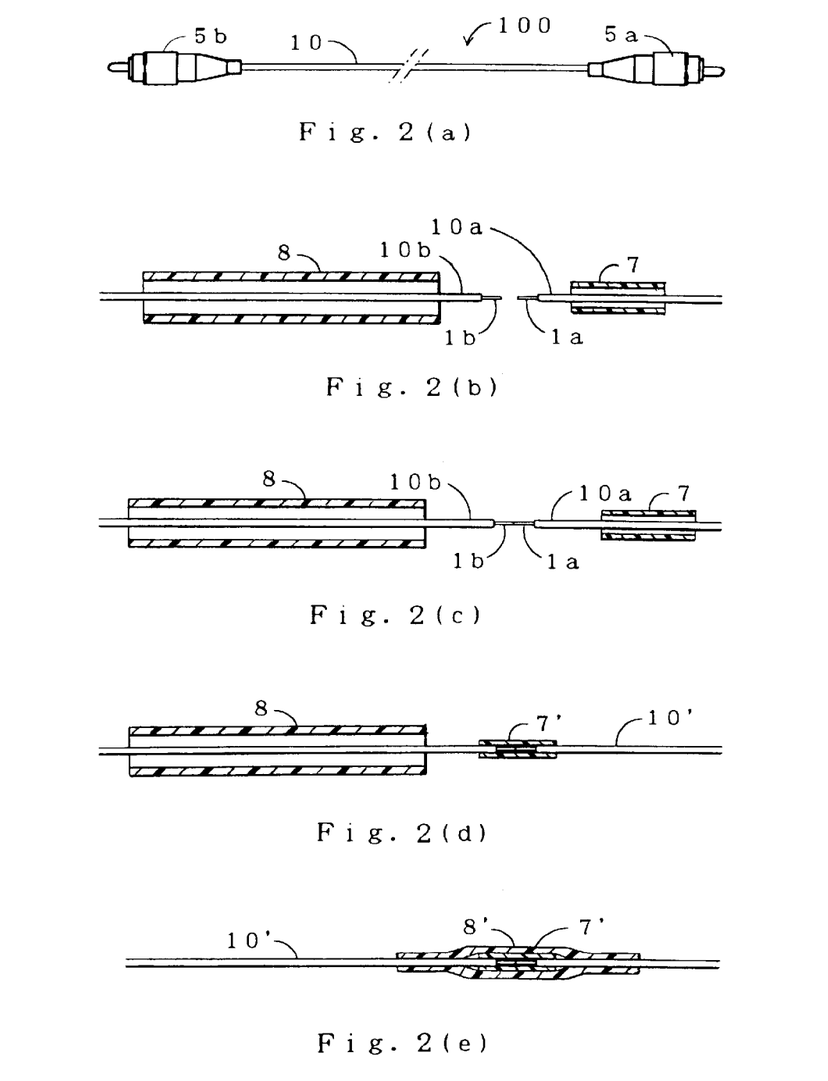

At Step S1, two connectors 5a and 5b are attached to two opposite ends of an optical cord 10 composed of an optical fiber and a coat, as shown in FIG. 2(a), thus forming an common optical fiber cable 100.

At Step S2, the optical cord 10 is cut into two segments 10a and 10b. An inner thermally shrinkable tube 7 is loosely sheathed onto the segment 10a over a cut end and an outer thermally shrinkable tube 8 is loosely sheathed onto the segment 10b over its cut end, as shown in FIG. 2(b).

At Step S3, the coats near the cutting end portions of the optical cord segments 10a and 10b are stripped to expose two optical fiber 1a and 1b respectively, as shown in FIG. 2(b). The two optical fiber 1a and 1b are then butted to each other as shown in FIG. 2(c).

At Step S4, the two optical fibers 1a and 1b are physically joined to each other by arc discharge of a relatively short duration. For example, the arc discharge may last three seconds.

At Step S5, the joint portion between the two optical fibers 1a and 1b is exposed to a high temperature for radially expanding a part of the core. For example, the application of a high temperature may be implemented by exposure to a flame of a mixture gas of propane and oxygen for 30 minutes. By controlling the ratio in the mixture gas, the distance between the joint portion and the flame, and the duration of exposure, the radially expanded core part is determined so that the attenuation is set to a desired level.

At Step S6, the inner thermally shrinkable tube 7 is moved to cover the stripped joint portion and then shrunk as shown in FIG. 2(d). The inner thermally shrinkable tube 7, after shrinking, is denoted by 7' and a resultant optical cord with the radially expanded core part is denoted by 10'.

At Step S7, the outer thermally shrinkable tube 8 is moved to cover the inner shrunk tube 7' and exposed to a high temperature of air so that it turns to an outer shrunk tube 8'.

Figure 3:
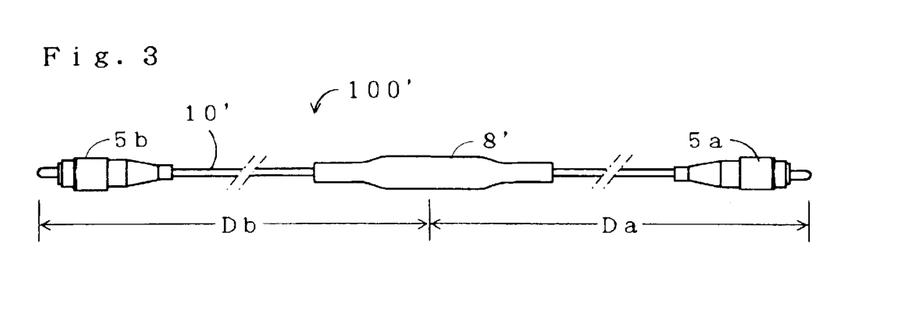
FIG. 3 is an external view of an optical fiber cable incorporating an optical attenuator showing another embodiment of the present invention.

As the result, an optical fiber cable incorporating the optical attenuator is completed as denoted at 100' in FIG. 3. Da is the distance between the radially expanded core part and the first end and Db is the distance between the radially expanded core part and the second end. The optical cable 100' produces a non-directional effect when Da and Db are ≧3 cm as will be explained later in more detail.

Figure 4:
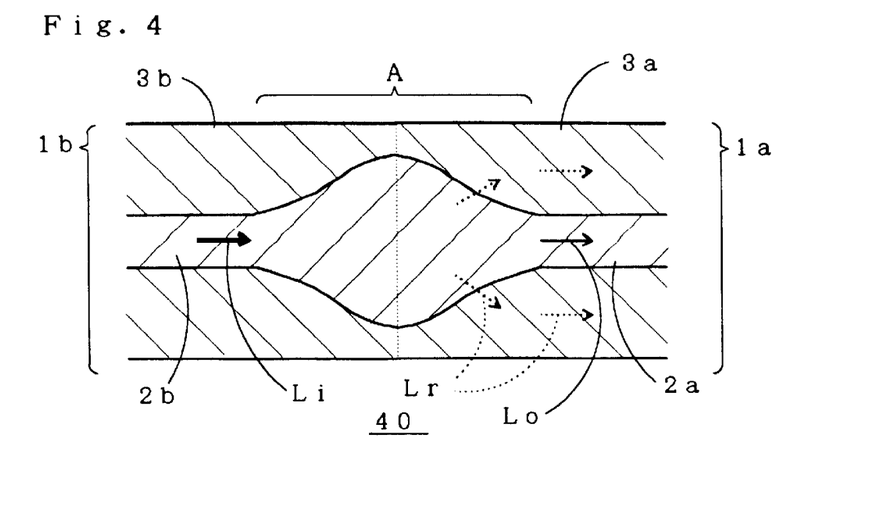
FIG. 4 is an enlarged cross sectional view of a radially expanded core part of the core.

FIG. 4 is an enlarged cross sectional view of an optical attenuator showing one embodiment of the present invention. As shown, it is more enlarged in the vertical direction than in the horizontal direction.

The radially expanded core part A is made by expanding two core regions 2a and 2b towards their respective clad regions 3a and 3b.

In action, when transmitting light Li is introduced from the core 2b into the radially expanded core part A, a part of the transmitting light Li enters into the clad 3a and travels as a leaked light Lr while the remaining light Lo propagates directly through the core 2a. It is similar when a transmitting light introduced from the core region 2a.

Figure 5:
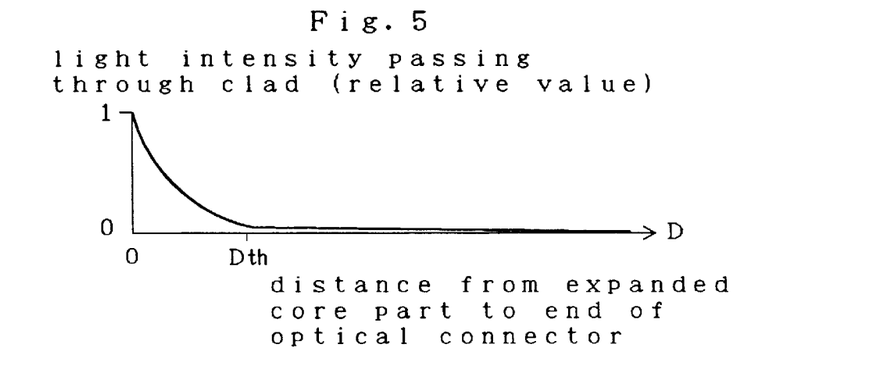
FIG. 5 is a graphic diagram showing the attenuation of leaked light entering the clad in relation to the distance from the radially expanded core part of the core.

FIG. 5 is a graphic diagram showing the leaked light Lr being attenuated during traveling from the radially expanded core part A through the clad 3a.

As apparent, the leaked light Lr is sharply attenuated upon departing the radially expanded core part A and hardly travels over a distance Dth. It was found through some experiments that the distance Dth is 3 cm.

Figure 6:
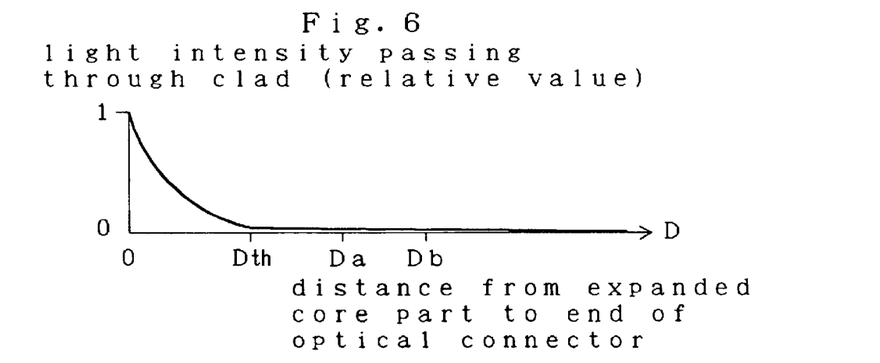
FIG. 6 is an explanatory view showing the theory of non-directional effect.

When Da, Db≧3 cm in the optical cable 100' incorporating the optical attenuator as shown in FIG. 6, any light traveling from the connector 5b to the connector 5a or vice versa is attenuated by the amount of leaked light which has entered the clad 3a or 3b. Accordingly, the optical cable 100' provides the effect of a non-directional optical attenuator.

Figure 7:
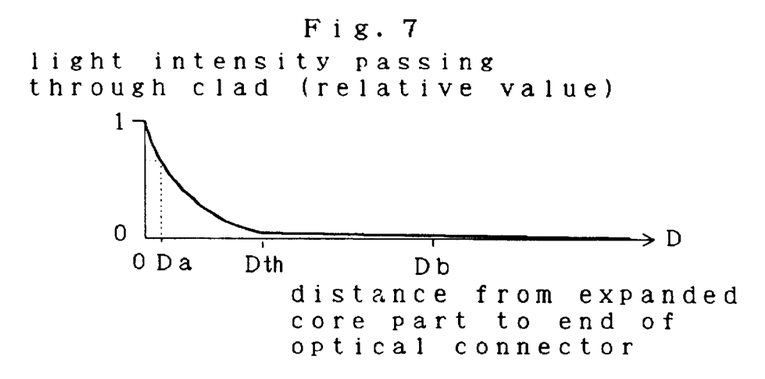
FIG. 7 is an explanatory view showing the theory of directional effect.

If Da<3 cm and Db≧3 cm as shown in FIG. 7, the leaked light Lr entering the clad 3a arrives at the connector 5a before being sharply attenuated and the transmitting light introduced from the connector 5b will be propagated to the connector 5a with minimum loss. On the contrary, the transmitting light introduced from the connector 5a is remarkably attenuated before arriving at the connector 5b as the leaked light is attenuated when entering and traveling through the clad 3b. Accordingly, the optical cable 100' provides the effect of a directional optical attenuator. Since Da is preferably as small as 1 cm for ease of machining and the effect of attenuation, the radially expanded core part A is practically installed in the connector 5a.

Figure 8:
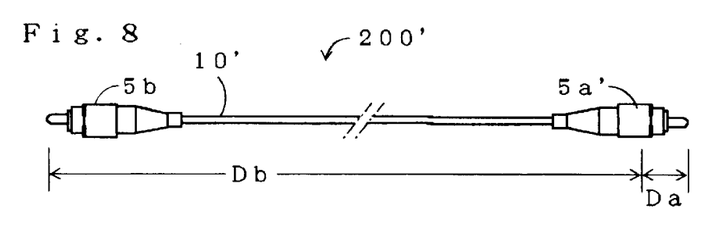
FIG. 8 is an external view of a directional optical fiber cable having a radially expanded core part of the core thereof located in a connector at one end.

FIG. 8 illustrates an optical fiber cable 200' incorporating such a directional optical attenuator.

Denoted by 5a' is a connector incorporating the optical attenuator (having the radially expanded core part A).

Figure 9:
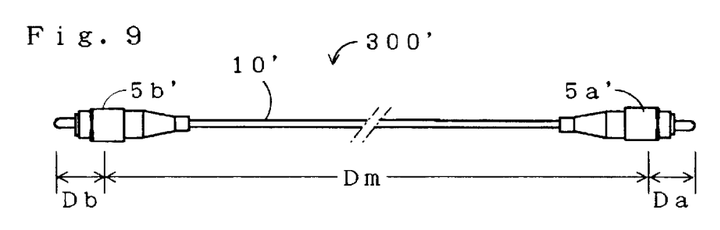
FIG. 9 is an external view of an optical fiber cable incorporating an optical attenuator of which two radially expanded core parts located in their respective connectors at both ends.

FIG. 9 is an external view of an optical fiber cable incorporating an optical attenuator showing another embodiment of the present invention.

The optical fiber cable incorporating an optical attenuator 300' comprises an optical cord 10' and two optical attenuator installed connectors 5a' and 5b' attached to both ends of the optical cord 10'. The distance Da between the first end and its nearest radially expanded core part is less than 3 cm, the distance Db between the second end and its nearest radially expanded core part is less than 3 cm, and the distance Dm between the first end nearest radially expanded core part and the second end nearest radially expanded core part is over 3 cm.

Accordingly, the optical fiber cable incorporating an optical attenuator 300' will function as a non-directional attenuator.

Figure 10:
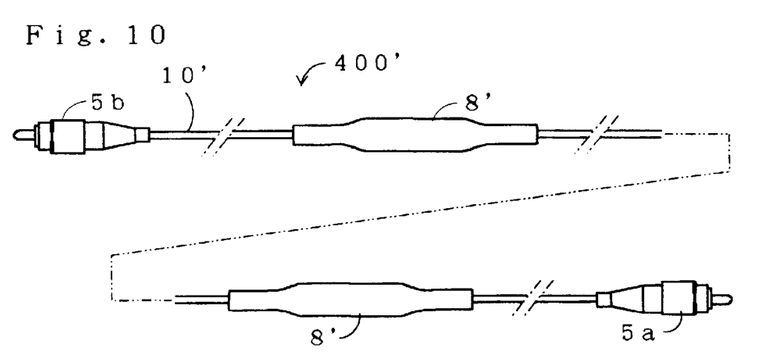
FIG. 10 is an external view of an optical fiber cable incorporating an optical attenuator having a plurality of radially expanded core parts of the core thereof.

FIG. 10 is an external view of an optical fiber cable incorporating an optical attenuator showing a further embodiment of the present invention.

The optical fiber cable incorporating an optical attenuator 400' comprises an optical cord 10' having a plurality of radially expanded core parts (covered with outer thermally shrunk tubes).

In the optical fiber cable incorporating an optical attenuator 400', the attenuation is set to a higher level with much ease, as compared with one single radially expanded core part without an increase in the level of attenuation.

Figure 11:
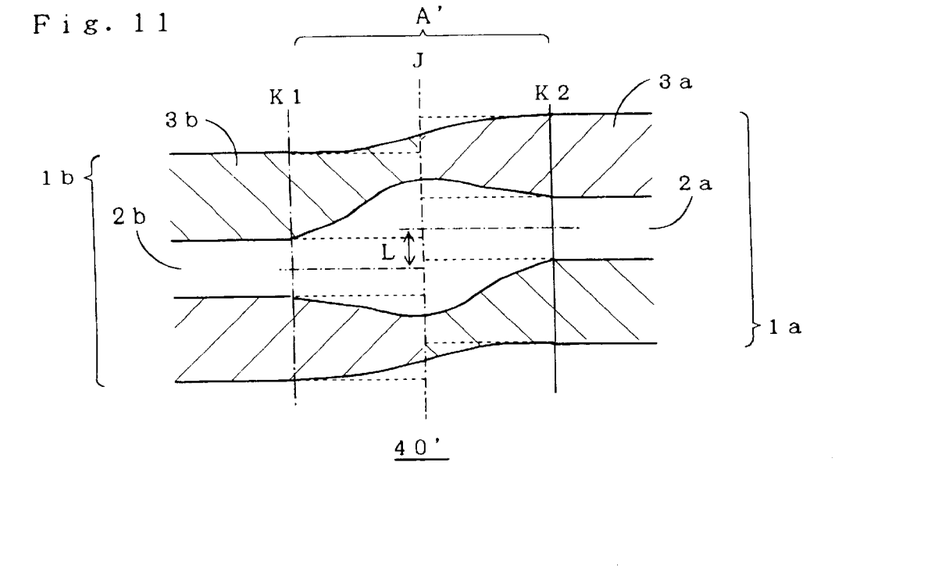
FIG. 11 is an enlarged cross sectional view of a primary part of an optical attenuator showing another embodiment of the present invention.

FIG. 11 is an enlarged cross sectional view of a primary part of an optical attenuator showing another embodiment of the present invention. As shown, it is more enlarged in the vertical direction than in the horizontal direction.

The optical attenuator 40' comprises an optical fiber 1a having a core 2a covered with a clad 3a and another optical fiber 1b having a core 2b covered with a clad 3b butted and joined at their ends to each other so that their core centers are dislocated by a distance L from each other. Also, the diameter of the cores are expanded greater than their original size (shown by the broken lines) at the joint portion J and moderately reduced back to their original size throughout the distance from the joint portion J to proximity locations K1, K2.

The optical attenuator 40' can be employed instead of the optical attenuator 40 shown in FIG. 4.

Figure 12:
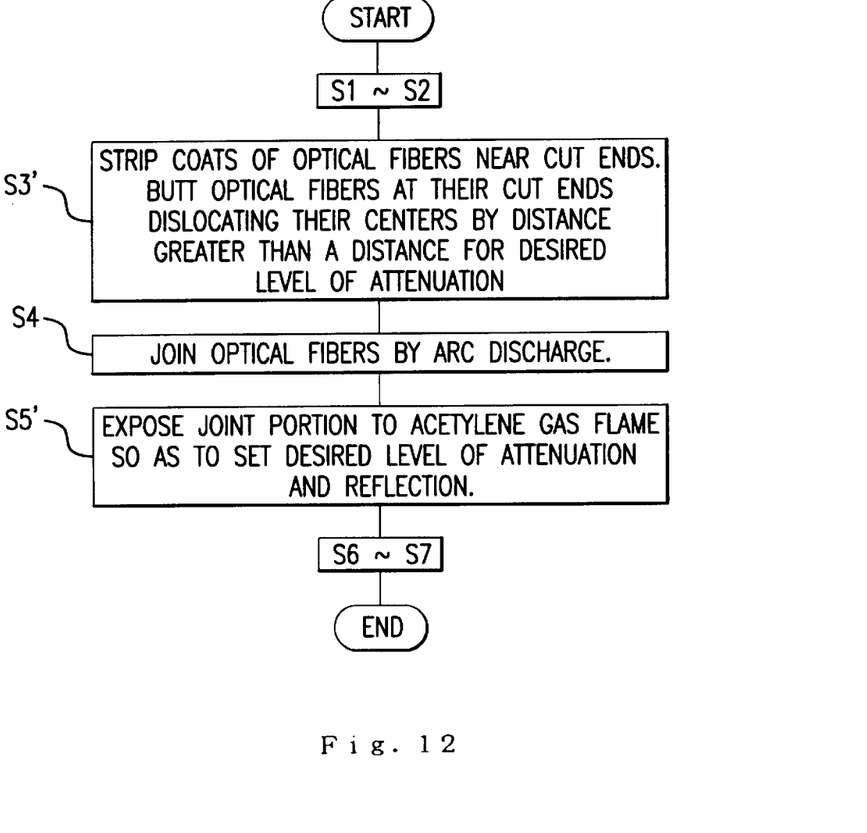
FIG. 12 is a flowchart showing a procedure of fabricating an optical fiber cable incorporating the optical attenuator shown in FIG. 11.

FIG. 12 is a flowchart showing a procedure of making an optical fiber cable incorporating the optical attenuator 40'.

Step S1 to S2 is the same as Step S1 to S2 shown in FIG. 1.

Figure 13A:
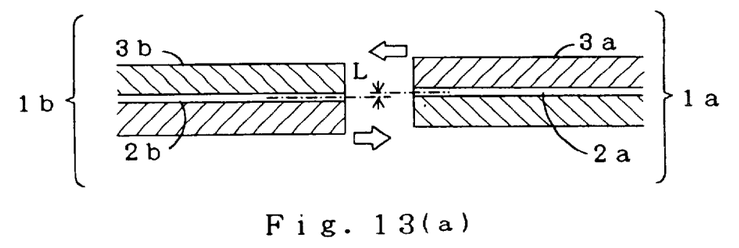
FIGS. 13a–13c illustrate cross sectional views of steps of the procedure of fabricating the optical attenuator shown in FIG. 11.

At Step S3', the coats near the cut end portions of the optical cord segments 10a and 10b are stripped to expose the two optical fibers 1a and 1b respectively. As shown in FIG. 13(a), the two optical fibers 1a and 1b, which are identical in core diameter, are butted at their ends to each other so that the center of one core is dislocated from the center of the other core by the distance L. The distance L is greater than a distance for a desired level of attenuation.

Figure 13B:
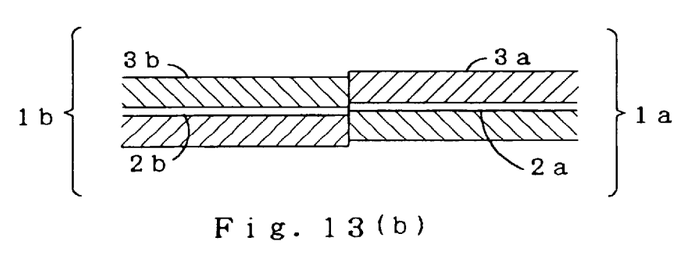

At Step S4, the two optical fiber 1a and 1b are physically joined to each other by arc discharge of a relatively short duration. For example, the arc discharge may last three seconds. FIG. 13(b) illustrates the joint portion after the arc discharge.

Figure 13C:
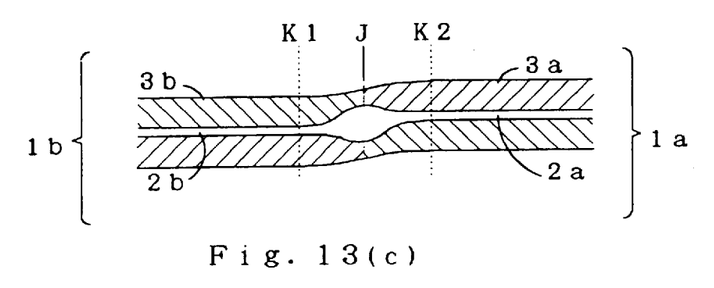

At Step S5', application of high temperature is made for a relatively long duration in order to reduce the attenuation level to the desired level. More specifically, the joint portion is exposed to a flame of acetylene gas ranging from 1700° C. to 1800° C. The exposing duration may vary depending on the core diameter of the optical fibers 1a and 1b and the condition of the acetylene gas flame, for example ranging from 1 to 60 minutes. It is possible to examine the level of attenuation during the exposure to a high temperature or carry on the exposure throughout a predetermined length of duration appropriate for gaining the desired level of attenuation. FIG. 13(c) shows a cross section after completion of the exposure to a high temperature. A part from the joint portion J to the two proximity location K1 and K2 has been heated up, and the cores 2a and 2b of the part are radially expanded. For example, when the original diameter of the optical fibers 1a and 1b is 10 micrometers, the expanded diameter at the joint J is about 15 micrometers.

Step S6 to S7 is the same as Step S6 to S7 shown in FIG. 1.

Figure 14:
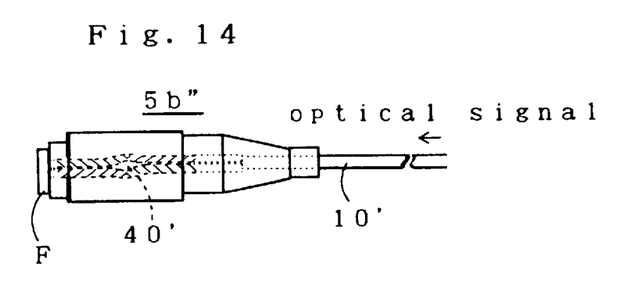
FIG. 14 is an explanatory view of an optical connector containing the optical attenuator shown in FIG. 11.

FIG. 14 is an explanatory view of an optical connector having the optical attenuator 40' installed therein.

The optical connector 5b" has a ferrule F projected from the front end thereof for connection with an opposite optical connector (not shown). The optical connector 5b''' is coupled at the rear end to an optical cord 10'. The optical attenuator 40' is interposed between the ferrule F and the optical cord 10'.

In action, an optical signal introduced via the optical fiber cord 10' from the outside is attenuated to a desired level by the optical attenuator 40' before transmitted to the opposite optical connector.

The optical attenuator 40' is precisely determined in the level of attenuation by controlling the application of a high temperature (at S5' of FIG. 12) regardless of a variation of the distance L between the core centers of the two optical fibers 1a and 1b.

Also, a complex machining process for making steps on the corresponding end surfaces of the two optical fibers 1a and 1b is eliminated whereby the overall procedure of production will be simplified.

EXAMPLE 1

A sample of the optical attenuator 40' shown in FIG. 11 was fabricated by butting. and joining two optical fibers 1a and 1b with a core diameter of 10 micrometers for transmission of a wavelength of 1.31 micrometers to each other so that the distance L between their core centers is 5.0 micrometers.

When the two optical fibers 1a and 1b were simply joined to each other as shown in FIG. 13(b), the level of attenuation was 5.0 dB. After the joint was exposed to a flame of acetylene gas for application of a heat of 1700° C. to 1800° C. for one minute, the level of attenuation was decreased to 3 dB.

EXAMPLE 2

Another sample of the optical attenuator 40' was fabricated by joining two optical fibers 1a and 1b with a core diameter of 10 micrometers for transmission of a wavelength of 1.31 micrometers to each other so that the distance L between their core centers is 10 micrometers.

When the two optical fibers 1a and 1b were simply joined to each other as shown in FIG. 13(b), the level of attenuation was 10.0 dB. After the joint was exposed to a flame of acetylene gas for application of a beat of 1700° C. to 1800° C. for three minutes, the level of attenuation was decreased to 3 dB.

As set forth above, any of the optical attenuators, the method of making the same, the optical fiber cable incorporating the optical attenuator and the method of making the same, according to the present invention, allows the reflection of transmitting light to input side to be minimized and the level of attenuation to be set at a higher accuracy. Also, the optical attenuator part has no step produced on the clad and can be installed in the connector without difficulty. Furthermore, the optical fiber cable according to the present invention can provide a directional function.

What is claimed is:

1. An optical attenuator, comprising:
   an optical fiber having a core surrounded by cladding;
   said core having at least one attenuation portion having a center and first and second ends;
   said core being radially expanded in said at least one attenuation portion such that a first diameter of said core at said center of said at least one attenuation portion is increased greater than a second diameter of said core outside said at least on attenuation portion to form a radially expanded core part; and
   said core at said at least one attenuation portion having a diameter tapering from said first diameter at said center of said at least one attenuation portion to said second diameter at said first and second ends of said at least one attenuation portion such that light transmitted in said core is dispersed into said cladding at said at least one attenuation portion.

2. The optical attenuator according to claim 1, wherein said optical fiber has first and second ends and the radially expanded core is provided not more than 3 cm from said first and second ends of the optical fiber.

3. The optical attenuator according to claim 1, wherein said optical fiber has first and second ends and two of said at least one attenuation portion are provided at two substantially symmetrical locations respectively spaced by less than 3 cm from the first and second ends of the optical fiber.

4. The optical attenuator according to claim 1, wherein said optical fiber has first and second ends and the radially expanded core part is provided spaced by less than 3 cm from one of the first and second ends of the optical fiber and by greater than 3 cm from another one said first and second ends of said optical fiber.

5. An optical attenuator comprising:
   first and second optical fibers each having an end and a core surrounded by cladding, an end portion terminating at said end, said core in said end portion having an expanded diameter at said end tapering to a smaller diameter at a juncture of said end portion with a remainder of said first and second optical fibers; and
   said ends of said optical fibers being butt jointed to each other such that axes of said cores are dislocated from each other to form a radially expanded core part comprised of said cores in said end portions wherein said radially expanded core part forms an attenuation portion with a center defined by a juncture of said ends butt jointed together.

6. The optical attenuator according to claim 5, wherein said first and second optical fibers each have a second end and the radially expanded core is provided not more than 3 cm from said second ends.

7. The optical attenuator according to claim 5, wherein said first and second optical fibers each have a second end and the radially expanded core part is provided spaced by less than 3 cm from the second end of one of the first and second optical fibers and by greater than 3 cm from another the second end of another one said first and second optical fibers.

8. An optical fiber cable comprising:
   an optical cord having first and second end connectors;
   first and second optical attenuators, at least one of said first and second optical attenuators including:
      first and second optical fibers each having an end and a core surrounded by cladding, an end portion terminating at said end, said core in said end portion having an expanded diameter at said end tapering to a smaller diameter at a juncture of said end portion with a remainder of said first and second optical fibers; and
      said ends of said optical fibers being butt jointed to each other such that axes of said cores are dislocated from each other to form a radially expanded core part comprised of said cores in said end portions wherein said radially expanded core part forms an attenuation portion with a center defined by a juncture of said ends butt jointed together; and
   said first and second optical attenuators being respectively disposed in the first and second end connectors.

9. An optical fiber cable comprising:

an optical cord having first and second end connectors:

first and second optical attenuators, at least one of said first and second optical attenuators including:
- an optical fiber having a core surrounded by cladding;
- said core having an attenuation portion having a center and first and second ends;
- said core being radially expanded in said attenuation portion such that a first diameter of said core at said center of said attenuation portion is increased greater than a second diameter of said core outside said attenuation portion to form a radially expanded core part; and
- said core at said attenuation portion having a diameter tapering from said first diameter at said center of said attenuation portion to said second diameter at said first and second ends of said attenuation portion such that light transmitted in said core is dispersed into said cladding at said attenuation portion; and said first and second optical attenuators being respectively disposed in the first and second end connectors.

10. An optical fiber cable comprising:

an optical cord having first and second end connectors;

an optical attenuator including:
- an optical fiber having a core surrounded by cladding;
- said core having an attenuation portion having a center and first and second ends;
- said core being radially expanded in said attenuation portion such that a first diameter of said core at said center of said attenuation portion is increased greater than a second diameter of said core outside said attenuation portion to form a radially expanded core part; and
- said core at said attenuation portion having a diameter tapering from said first diameter at said center of said attenuation portion to said second diameter at said first and second ends of said attenuation portion such that light transmitted in said core is dispersed into said cladding at said attenuation portion; and said optical attenuator being respectively disposed in one of the first and second connectors.

11. An optical fiber cable comprising:

an optical cord having first and second end connectors;

an optical attenuator including:
- first and second optical fibers each having an end and a core surrounded by cladding, an end portion terminating at said end, said core in said end portion having an expanded diameter at said end tapering to a smaller diameter at a juncture of said end portion with a remainder of said first and second optical fibers; and
- said ends of said optical fibers being butt jointed to each other such that axes of said cores are dislocated from each other to form a radially expanded core part comprised of said cores in said end portions wherein said radially expanded core part forms an attenuation portion with a center defined by a juncture of said ends butt jointed together; and said optical attenuator being respectively disposed in one of the first and second end connectors.

12. A method of making an optical fiber cable incorporating an optical attenuator, comprising the following steps:

attaching first and second connectors to first and second ends of an optical cord respectively which is composed of an optical fiber and a coat to produce an optical fiber cable wherein the optical fiber has a core and cladding;

cutting the optical cord into two segments;

putting a thermally shrinkable tube on one of the segments over a cut end of the one of the segments;

butting the two segments;

joining the two segments by arc discharge to form a joint portion;

applying a high temperature to the joint portion for a duration sufficient to expand said core of said optical fiber proximate the joint portion to produce a radially expanded core part wherein a diameter of said core at a center of said joint part is increased greater than a diameter of said core outside said radially expanded core part and tapers to said diameter of said core outside said radially expanded core part on both sides of said center;

placing the thermally shrinkable tube over the radially expanded core part; and shrinking the thermally shrinkable tube so that it protects the radially expanded core part.

13. A method of making an optical attenuator, comprising the following steps:

applying a high temperature to at least one portion of an optical fiber having a core and cladding surrounding said core for a duration sufficient to radially expand said core at a center of said at least one portion to have a first diameter greater than a second diameter of said core outside said at least one portion and before expansion wherein said at least one portion forms an attenuation portion with first and second ends; and said core at said attenuation portion having a diameter tapering from said first diameter at said center to said second diameter at said first and second ends of said at least one attenuation portion such that light transmitted in said core is dispersed into said cladding at said at least one portion.

14. A method of making an optical attenuator using two optical fibers having cores and cladding, comprising the following steps:

butting end of said two optical fibers to each other with centers of said cores being dislocated from each other by a distance which is greater than a distance appropriate for setting to a desired level of attenuation based on dislocation of core centers;

joining the two optical fibers by arc discharge to form a joint portion; and applying a high temperature to said joint portion for a duration sufficient to decrease an attenuation of said joint portion to the desired level by radially expanding said cores at said joint portion to form a radially expanded core part where diameters of the cores are increased greater than an original diameter prior to application of said high temperature at said joint portion and taper to said original diameter at ends of the joint portion.

15. The method of making an optical attenuator according to claim 14, wherein said step of applying said high temperature includes heating the joint portion by a flame of more than 1700° C. for over one minute.

* * * * *